(12) United States Patent
Lang et al.

(10) Patent No.: US 10,919,514 B2
(45) Date of Patent: Feb. 16, 2021

(54) APPARATUS FOR CONTROLLING/REGULATING THE TRAVEL SPEED OF A UTILITY VEHICLE AND METHOD FOR SAME

(71) Applicant: Liebherr-Hydraulikbagger GmbH, Kirchdorf/Iller (DE)

(72) Inventors: Johannes Lang, Altenstadt (DE); Bernhard Meitinger, Buxheim (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 1070 days.

(21) Appl. No.: 14/060,418

(22) Filed: Oct. 22, 2013

(65) Prior Publication Data

US 2014/0116039 A1    May 1, 2014

(30) Foreign Application Priority Data

Oct. 25, 2012    (DE) .......................... 10 2012 020 984

(51) Int. Cl.
| | |
|---|---|
| *E02F 9/22* | (2006.01) |
| *B60W 10/06* | (2006.01) |
| *F04B 49/10* | (2006.01) |
| *F16H 61/4061* | (2010.01) |
| *B60K 31/00* | (2006.01) |
| *F16H 61/431* | (2010.01) |

(Continued)

(52) U.S. Cl.
CPC ............. *B60W 10/06* (2013.01); *B60K 31/00* (2013.01); *E02F 9/2253* (2013.01); *F04B 49/103* (2013.01); *F16H 61/4061* (2013.01); *F16H 61/421* (2013.01); *F16H 61/431* (2013.01); *F16H 61/47* (2013.01); *F15B 2211/20546* (2013.01); *F15B 2211/3054* (2013.01); *F15B 2211/6346* (2013.01); *F15B 2211/6355* (2013.01); *F15B 2211/6651* (2013.01); *F15B 2211/7058* (2013.01)

(58) Field of Classification Search
CPC .... E02F 9/2253; E02F 9/2246; F16H 61/421; F15B 2211/6651
See application file for complete search history.

(56) References Cited

U.S. PATENT DOCUMENTS

| | | | | |
|---|---|---|---|---|
| 5,488,787 A | * | 2/1996 | Aoyagi ................. | E02F 9/2217 172/2 |
| 5,784,883 A | * | 7/1998 | Ohkura ................. | B60W 10/06 60/327 |

(Continued)

FOREIGN PATENT DOCUMENTS

| | | |
|---|---|---|
| DE | 10310980 B3 | 4/2004 |
| WO | 2008028551 A1 | 3/2008 |
| WO | 2009083222 A1 | 7/2009 |

*Primary Examiner* — Abiy Teka
(74) *Attorney, Agent, or Firm* — McCoy Russell LLP

(57) ABSTRACT

The present disclosure relates to an apparatus for controlling/regulating the travel speed of a utility vehicle comprising at least one drive motor, at least one hydraulic pump, at least one control slide valve, at least one hydraulic travel motor, at least one further hydraulic drive, as well as at least one controller. In accordance with the present disclosure, the travel speed of the at least one hydraulic travel motor is controlled/regulated via at least the speed of the drive motor, while the at least one further hydraulic drive does not provide any drive power.

6 Claims, 5 Drawing Sheets

(51) Int. Cl.
*F16H 61/421* (2010.01)
*F16H 61/47* (2010.01)

(56) References Cited

U.S. PATENT DOCUMENTS

| | | | |
|---|---|---|---|
| 6,564,548 B2 * | 5/2003 | Nishimura | ............... B66C 13/18 |
| | | | 60/431 |
| 2007/0144163 A1 | 6/2007 | Kim | |
| 2008/0264499 A1 * | 10/2008 | Bacon | ..................... E02F 9/226 |
| | | | 137/563 |

* cited by examiner

APPARATUS FOR CONTROLLING/REGULATING THE TRAVEL SPEED OF A UTILITY VEHICLE AND METHOD FOR SAME

CROSS REFERENCE TO RELATED APPLICATION

This application claims priority to German Patent Application No. 10 2012 020 984.3, entitled "Apparatus for Controlling/Regulating the Travel Speed of a Utility Vehicle and Method for Same," filed on Oct. 25, 2012, which is hereby incorporated in its entirety for all purposes.

TECHNICAL FIELD

The present disclosure relates to an apparatus for controlling/regulating the travel speed of a utility vehicle and a method for same.

BACKGROUND AND SUMMARY

Apparatus and methods for controlling/regulating the speed of utility vehicles are known from the prior art. Common systems comprise, for example, hydraulic drives in which a pressure medium such as hydraulic oil is first pressurized by a drive motor and by a hydraulic pump in order then to be utilized for the propulsion of the utility vehicle. The pressure medium in this respect drives a hydraulic travel motor to move. Furthermore, the pressure medium can be utilized for operating further hydraulic drives such as hydraulic cylinders for excavator arms or similar. In this respect, the different drives or consumers of the utility vehicle can have mutually different demands on the load pressure and flow rate of the pressure medium. It is therefore known to provide control/regulation elements such as control slide valves for setting the different consumers via which control slide valves the different load pressures and flow rates on operation of the consumers can be set. Such a control slide valve can, for example, release a specific quantity of oil to a hydraulic travel motor in dependence on the position of the control slide valve in order to control/regulate the travel speed of the vehicle via this released quantity.

The hydraulic pump pressurizing the pressure medium is in this respect operated in a hydraulically mechanical pressure regulation circuit in which a supply pressure is generated which is increased by an excess pressure Δp with respect to the highest occurring load pressure.

To achieve the desired speed, the supply pressure can, for example, be controlled/regulated down to the load pressure, which corresponds to the desired speed, via a restrictor apparatus of the control slide valve.

The problem hereby arises that a corresponding restriction of the supply pressure has the consequence of a power loss corresponding to the excess pressure in the form of emitted heat energy.

It is therefore the object of the present disclosure to provide a method of controlling/regulating the speed of utility vehicle which is improved with respect to its efficiency. This object is achieved by an apparatus for controlling/regulating a travel speed of a utility vehicle comprising at least one drive motor, at least one hydraulic pump, at least one control slide valve, at least one hydraulic travel motor, at least one further hydraulic drive as well as at least one controller, wherein the travel speed of the at least one hydraulic travel motor is controlled/regulated via the speed of the drive motor, while the at least one further hydraulic drive does not produce any drive power.

In a parallel operation of two or more functions of the utility vehicle such as a simultaneous driving of an excavator and a moving of an excavator bucket, a control slide valve of the named kind is provided in accordance with the present disclosure for the control/regulation of the speeds and of the directions of the processes taking part in parallel due to the different demand profiles of the different consumers on the pressure medium.

If, in contrast, a purely driving operation is present, that is an operation in which a drive power is only provided by the at least one hydraulic travel motor and not from any other hydraulic drives, the setting of the pressure medium required for the speed control/regulation can be carried out via a speed regulation of the drive motor.

This has the advantage that a supply pressure can be generated in this manner which is as close as possible to the load pressure required for the desired travel speed. The loss-inducing restriction of a supply pressure to a desired lower load pressure is hereby dispensed with in comparison with the prior art. The hydraulic pump may be fully outwardly pivoted in this respect.

While the direction control of the hydraulic travel motor always takes place via the control slide valve, it is still conceivable for the control/regulation of the travel speed that the controller of the apparatus is connected via further interfaces to further apparatus components and also controls the control/regulation procedure of the travel speed via them.

In a further embodiment with a second interface between the controller and the hydraulic travel motor, the travel speed of the at least one hydraulic travel motor can thus also be controlled/regulated via the setting of the pivot angle of the hydraulic travel motor.

Another embodiment comprises the use of a third interface between the controller and the hydraulic pump so that the travel speed of the at least one hydraulic travel motor can also be controlled/regulated via the setting of the pivot angle of the hydraulic pump.

All commercial motor types can generally be considered as the drive motor. The present disclosure is not restricted to the use of the diesel engines most common today, but can also be performed with gasoline engines, or the drive power can be provided by hybrid units or by systems based on fuel cells. It is, however, possible that the drive motor is a diesel engine.

The present disclosure further relates to a method for controlling/regulating the drive speed of a utility vehicles, wherein the method comprises at least one step in which it is detected whether further consumers are operated in addition to the at least one hydraulic travel motor and wherein, in the case in which no further consumers are operated, the travel speed control/regulation is switched in a further step from a control/regulation via a control/regulation element such as a control slide valve to a travel speed control/regulation alternative to this.

Provision can be made that the alternative travel speed control/regulation comprises a control/regulation of the travel speed of the at least one hydraulic travel motor via a control/regulation of the speed of a drive motor.

It is furthermore possible that the alternative travel speed control/regulation comprises a control/regulation of the travel speed of the at least one hydraulic travel motor via the setting of a pivot angle of the hydraulic travel motor.

It is furthermore possible that the alternative travel speed control/regulation comprises a control/regulation of the travel speed of the at least one hydraulic travel motor via the setting of a pivot angle of the hydraulic pump.

Further advantages and details of the present disclosure will be described in more detail with reference to the following description which refers to the Figures.

DETAILED DESCRIPTION

Figure 1:
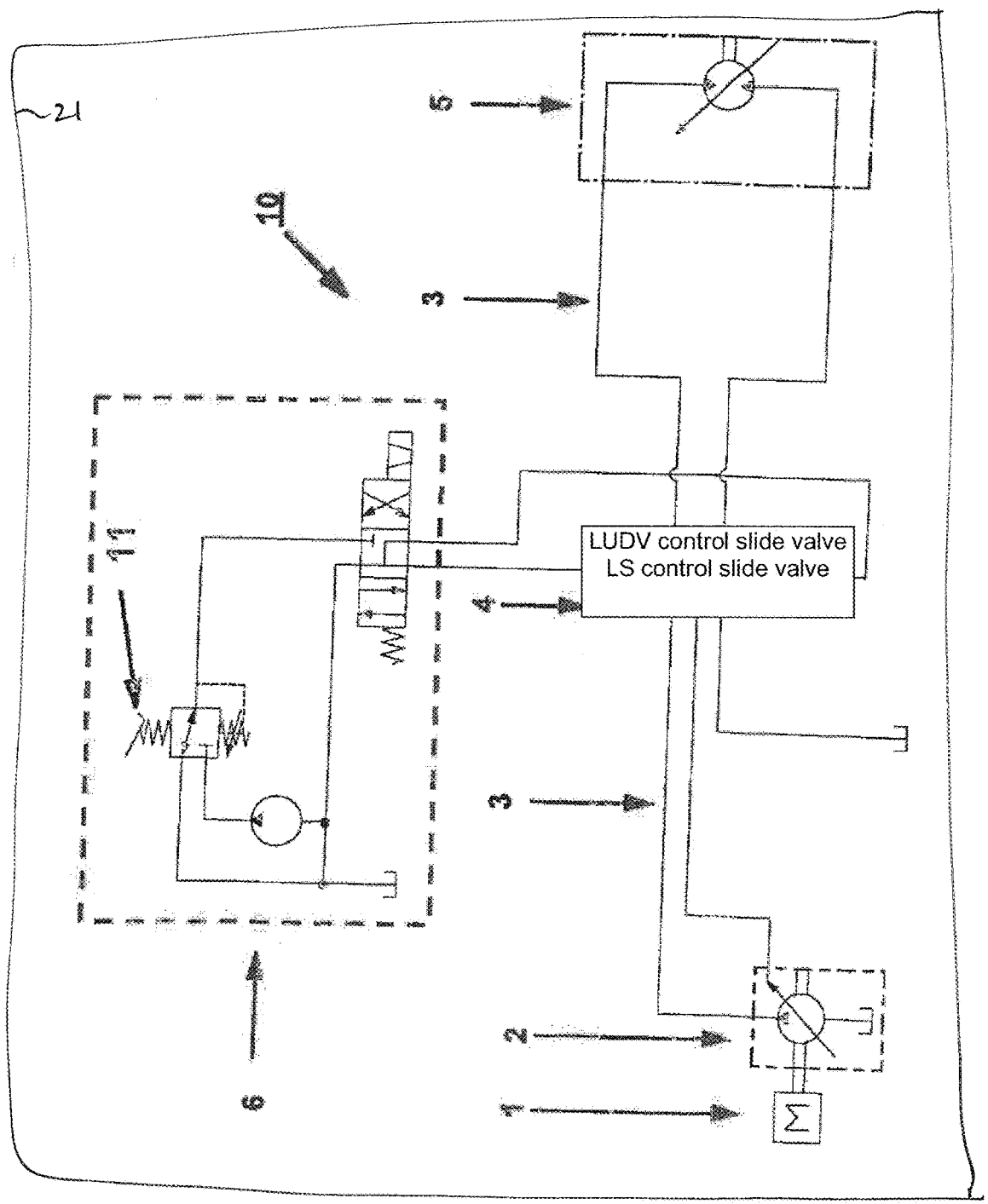
FIG. 1 shows an apparatus for controlling/regulating the speed by the control slide valve in accordance with the prior art.

FIG. 1 shows an apparatus 10 for controlling/regulating the speed of a utility vehicle. The utility vehicle itself is not shown in this respect, but rather illustrated schematically as 21. A drive motor 1 in this respect drives a hydraulic pump 2 to pressurize a pressure medium such as hydraulic oil. The pressure medium can be supplied to the control slide valve 4 via one of the hydraulic lines 3. It is the job of the control slide valve 4 to supply pressure medium in dependence on demand to one or more consumers.

The example shown in this respect comprises an electro-hydraulic precontrol 6 by which the control slide valve 4 can be precontrolled with respect to speed and direction of the hydraulic travel motor 5 via a pressure regulation valve 11 or a 4/3 way valve. The pressure regulation valve 11 can in this respect, for example, be configured as a hydraulic gas pedal 11. The travel motor may be coupled to a wheel, or track, that drives the vehicle.

The control slide valve 4 inter alia reduces the supply pressure provided by the hydraulic pump 2 by a restrictor apparatus, for example, in order thus to reduce it to a lower load pressure required by one of the consumers. The power loss which occurs in this respect is discharged from the system as heat and cannot be used for the drive.

Figure 2:
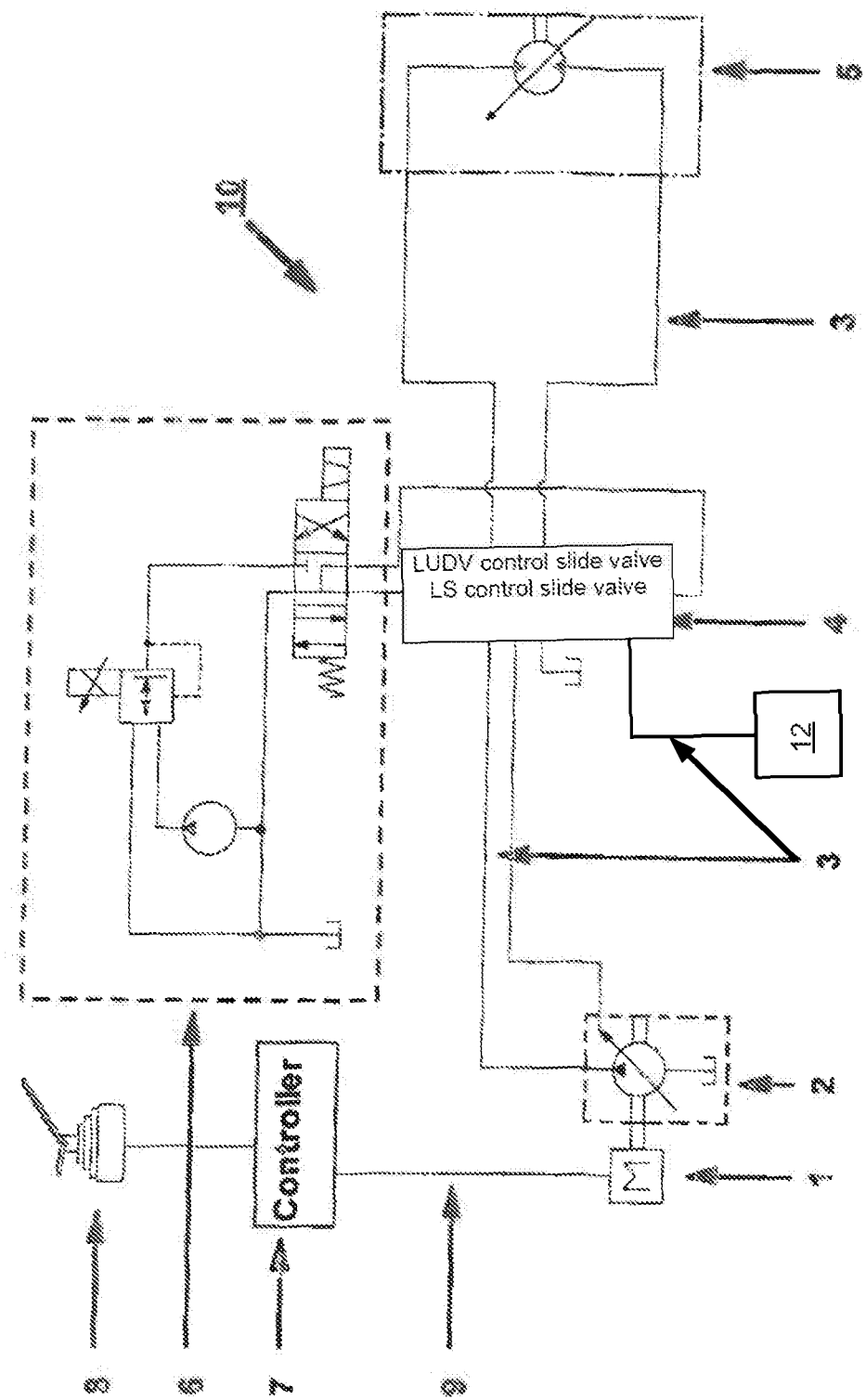
FIG. 2 shows an apparatus for controlling/regulating the speed by the drive motor.

FIG. 2 shows an apparatus 10 in accordance with the present disclosure which, unlike the prior art shown in FIG. 1, comprises a controller 7 which is connected on the input side to an input element 8 and on the output side to the drive motor 1. The controller 7 receives information on a desired travel speed of the utility vehicle via the input element 8 which can, for example, be the gas pedal of the utility vehicle or any other switch or regulator. If the controller 7 determines that no further consumers (e.g., further consumer 12) are operated except for the hydraulic travel motor 5, the controller 7 thus generates a signal corresponding to the received information and forwards it via a connection 9 to the drive motor 1 to set the rotational speed of the travel motor 1 in accordance with the desired travel speed. A restriction procedure thus no longer takes place in the region of the control slide valve 4 for the purpose of the travel speed control/regulation and the power losses occurring in the example of FIG. 1 are minimized.

Figure 3:
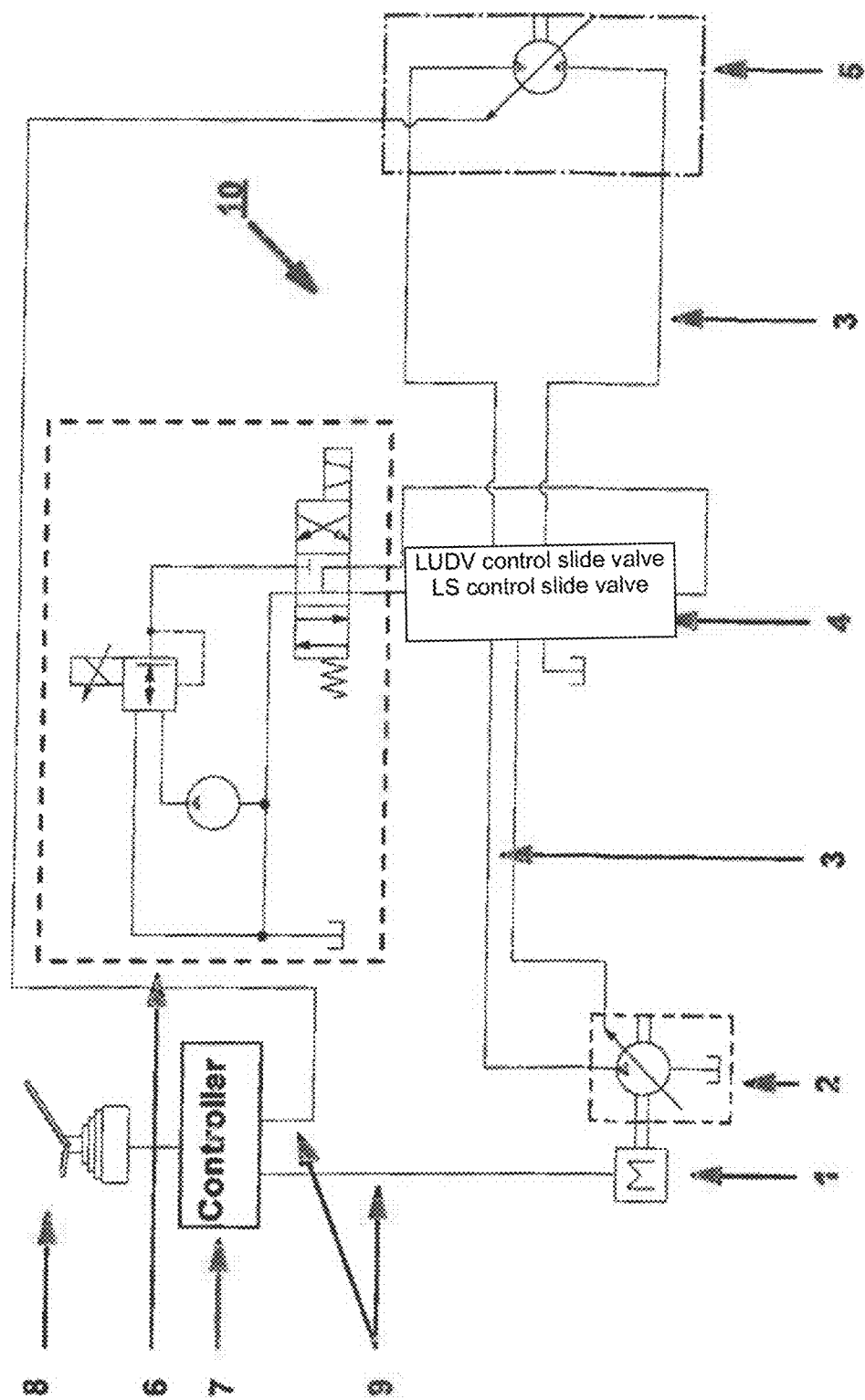
FIG. 3 shows an apparatus for controlling/regulating the speed by the drive motor and the hydraulic travel motor.

FIG. 3 shows an embodiment with a further intervention possibility for the control/regulation of the travel speed of the hydraulic travel motor 5. The controller 7 is not only connected to the drive motor 1 in this embodiment, but also via a second connection 9 to the hydraulic travel motor 5. It is possible at the hydraulic travel motor 5 itself to vary the pivot angle of the hydraulic travel motor 5 in dependence on the desired travel speed of the utility vehicle. Two intervention possibilities thus result in this embodiment for controlling/regulating the travel speed of the utility vehicle.

Figure 4:
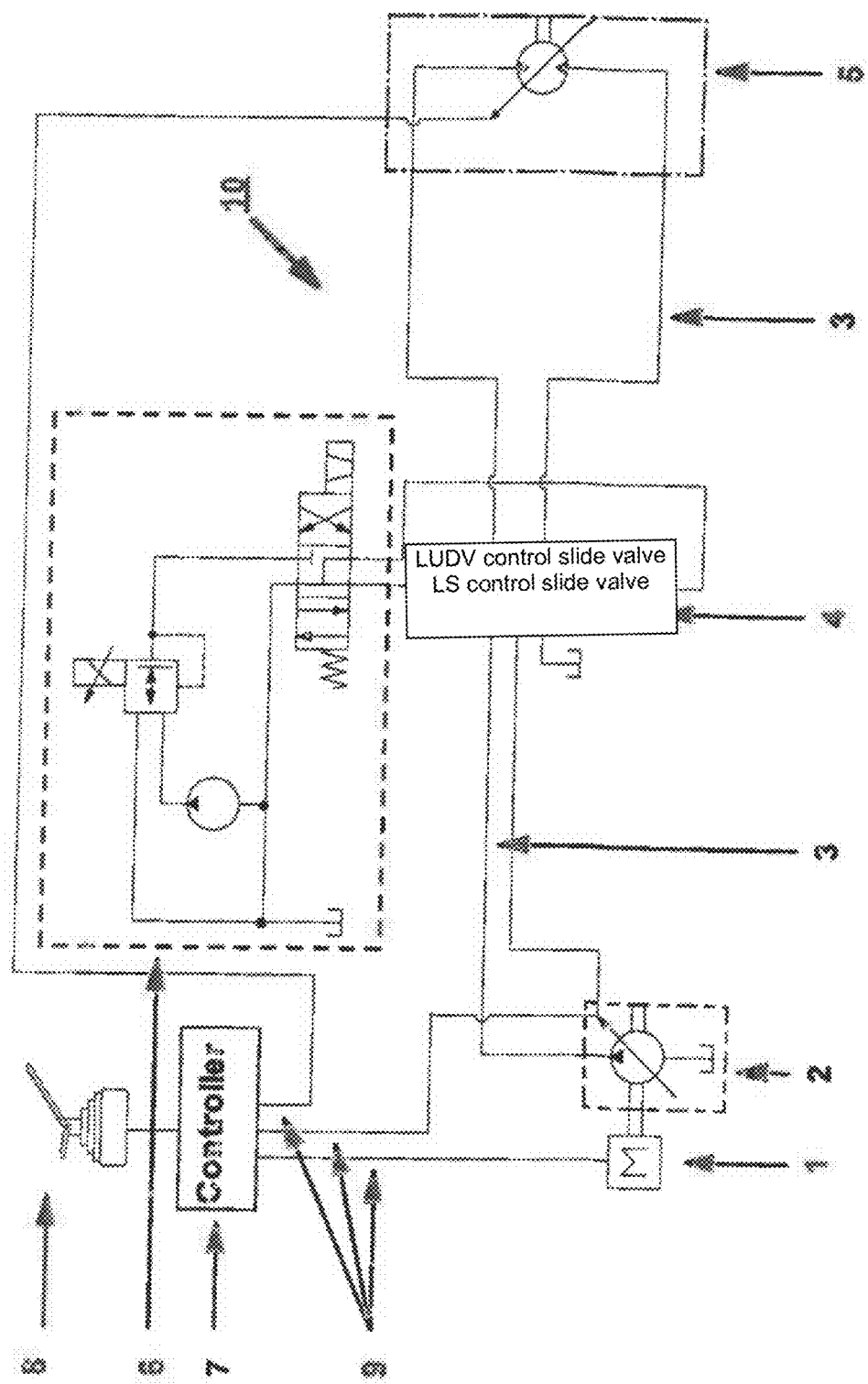
FIG. 4 shows an apparatus for controlling/regulating the speed by the drive motor, the hydraulic pump and the hydraulic travel motor.

An embodiment having three intervention possibilities for controlling/regulating the travel speed of the hydraulic travel motor 5 is shown in FIG. 4. The controller 7 is, as in the previous example, connected to the drive motor 1 and to the hydraulic travel motor 5 and can furthermore control/regulate the hydraulic pump 2 via a third connection 9. As the pivot angle of the hydraulic motor 5 in the previous embodiment can be varied by the controller 7, in the present third embodiment the pivot angle of the hydraulic pump 2 can thus be varied by the controller 7.

Controller 7 may include a processor and memory, the memory including non-transitory instructions stored therein for adjusting the various actuators in response to sensed information, as described herein. For example, the travel speed of the hydraulic travel motor may be controlled/regulated by the controller via adjustment of the speed of the drive motor, while a further hydraulic drive does not produce any drive power, for example to propel the vehicle, the further drive motor controlled by the controller. Not producing any drive power may include not producing or supplementing any tractive effort of the vehicle, and my further include not producing any braking power as well.

Figure 5A:
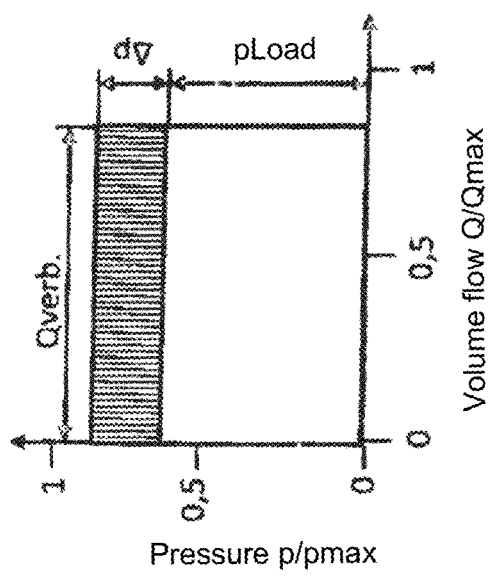
FIGS. 5a and 5b show a pressure volume flow diagram.
Figure 5B:
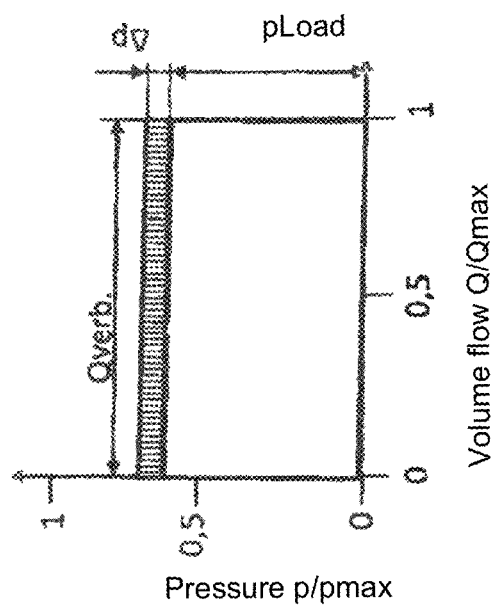

FIGS. 5a and 5b show the parameters of supply pressure ("Pressure"), load pressure ("pLoad"), volume flow and the pressure difference $\Delta p$ between the supply pressure and the load pressure in dependence on one another. The volume flow and the supply pressure are in this respect normalized with respect to their respective maximum values.

FIG. 5a shows the power loss graphically which results on the restriction procedure known from the prior art. The power loss is proportional to $\Delta p$ which is dependent on the pressure difference between the supply pressure and the load pressure of the hydraulic travel motor 5 lower in comparison therewith.

FIG. 5b in contrast shows the power loss of the apparatus 10 in accordance with the present disclosure or of the method in accordance with the present disclosure. It can be recognized in this respect that $\Delta p$ is reduced by the possible direct control/regulation in accordance with the present disclosure of the drive motor 1, the pivot angle of the hydraulic travel motor 5 and/or the pivot angle of the hydraulic pump 2 with respect to the prior art. The same load pressure as in FIG. 5a can therefore be provided while applying a smaller supply pressure.

The figures herein utilize standardized hydraulic symbols in the figures to represent particular hydraulic components as would be understood by one skilled in the art. For example, the hydraulic circuits illustrated in the figures include various pumps, sump returns, sump draws, etc., as indicated.

The invention claimed is:

1. An apparatus for controlling/regulating a travel speed of a utility vehicle comprising at least one drive motor, at least one hydraulic pump, exactly one control slide valve, at least one hydraulic travel motor, at least one further hydraulic drive as well as at least one controller, wherein during a purely vehicle traveling operation, the travel speed of the at least one hydraulic travel motor is controlled/regulated via a speed of the drive motor and a supply pressure of a pressure medium supplied to the at least one hydraulic travel motor by the at least one hydraulic pump is not restricted by the control slide valve, while the at least one further hydraulic drive does not produce any drive power, and wherein the supply pressure of the pressure medium supplied to the at least one hydraulic travel motor by the at least one hydraulic pump is restricted by the control slide valve only during operation of one or more further consumers of the utility vehicle.

2. The apparatus in accordance with claim 1, wherein the hydraulic pump is fully outwardly pivoted.

3. The apparatus in accordance with claim 1, wherein a direction of rotation of the at least one hydraulic travel motor is controlled/regulated via the control slide valve.

4. The apparatus in accordance with claim 1, wherein the travel speed of the at least one hydraulic travel motor is controlled/regulated via a setting of a pivot angle of the hydraulic travel motor.

5. The apparatus in accordance with claim 1, wherein the travel speed of the at least one hydraulic travel motor is controlled/regulated via a setting of a pivot angle of the hydraulic pump.

6. The apparatus in accordance with claim 1, wherein the drive motor is a diesel engine.

\* \* \* \* \*